United States Patent
Minardi et al.

(10) Patent No.: US 7,177,494 B1
(45) Date of Patent: Feb. 13, 2007

(54) OPTICAL CONTROL DEVICE AND METHOD

(75) Inventors: John E. Minardi, Dayton, OH (US); John L. Janning, Dayton, OH (US)

(73) Assignee: St. Clair Intellectual Property Consultants, Inc., Grosse Pointe, MI (US)

( * ) Notice: Subject to any disclaimer, the term of this patent is extended or adjusted under 35 U.S.C. 154(b) by 0 days.

(21) Appl. No.: 11/035,579

(22) Filed: Jan. 14, 2005

(51) Int. Cl.
*G02B 6/26* (2006.01)
*G02F 1/295* (2006.01)

(52) U.S. Cl. .......................... 385/16; 385/8
(58) Field of Classification Search .............. 385/2, 385/8, 16–18
See application file for complete search history.

(56) References Cited

U.S. PATENT DOCUMENTS

| | | | |
|---|---|---|---|
| 3,539,244 A | 11/1970 | Marks | |
| 3,834,792 A | 9/1974 | Janning | |
| 4,313,651 A | 2/1982 | Miller, Jr. | |
| 4,386,827 A | 6/1983 | Scifres et al. | |
| 4,462,658 A | 7/1984 | Scifres et al. | |
| 4,706,094 A | 11/1987 | Kubick | |
| 4,877,312 A | 10/1989 | Huignard et al. | |
| 4,925,261 A | 5/1990 | Byckling et al. | |
| 4,930,853 A | 6/1990 | Grego | |
| 4,973,121 A | 11/1990 | Brophy et al. | |
| 4,973,900 A | 11/1990 | Aoshima et al. | |
| 4,995,689 A | 2/1991 | Sarraf | |
| 5,055,770 A | 10/1991 | Takahashi et al. | |
| 5,071,253 A | 12/1991 | Chase | |
| 5,175,642 A | 12/1992 | Funato | |
| 5,253,098 A | 10/1993 | Hikita et al. | |
| 5,291,566 A | 3/1994 | Harris | |
| 5,291,567 A | 3/1994 | Revelli, Jr. et al. | |
| 5,303,316 A | 4/1994 | Hammer | |
| 5,425,115 A * | 6/1995 | Wagner ..................... | 385/16 |
| 5,658,439 A | 8/1997 | Burkle et al. | |
| 6,567,206 B1 | 5/2003 | Minardi et al. | |

(Continued)

FOREIGN PATENT DOCUMENTS

GB 2215898 A 9/1989

OTHER PUBLICATIONS

Journal of Applied Physics, "Director tilting of liquid crystals on photoisomerizable polyimide alignment layers doped with homeotropic surfactant", Aug. 15, 1999, vol. 86, Issue 4, pp. 1854-1859.

(Continued)

*Primary Examiner*—Sung Pak
*Assistant Examiner*—Tina M Wong
(74) *Attorney, Agent, or Firm*—Dykema Gossett PLLC

(57) ABSTRACT

An optical control device allows switching of signals without mechanical components. The device includes a first member; a second member; an active stage between the first member and the second member, the active stage including an electro-optical material; a first transmission region for transmitting a first optical signal toward the first member; and a second transmission region for transmitting a second optical signal toward the second member. The index of refraction of the active stage can be varied to either reflect both the first optical signal and the second optical signal or to permit the transmission of the first optical signal and the second optical signal through the first and second member. The index of refraction can be controlled by an electric field associated with the active stage. A method for using an optical control device is also disclosed.

25 Claims, 4 Drawing Sheets

U.S. PATENT DOCUMENTS

| | | | |
|---|---|---|---|
| 6,778,722 B1* | 8/2004 | Klocek et al. | 385/16 |
| 6,810,164 B2* | 10/2004 | Dorschner et al. | 385/16 |
| 6,901,175 B2* | 5/2005 | Baxter et al. | 385/11 |
| 2002/0075783 A1 | 6/2002 | Alon et al. | |
| 2002/0118433 A1 | 8/2002 | Romanovsky | |
| 2002/0136482 A1* | 9/2002 | Zhang | 385/16 |
| 2004/0179770 A1* | 9/2004 | Sage | 385/16 |
| 2004/0227455 A1* | 11/2004 | Moon et al. | 313/501 |
| 2005/0232535 A1* | 10/2005 | Toda et al. | 385/16 |

OTHER PUBLICATIONS

Journal of Applied Physics, "Approximate description of the three dimensional director and electric field in a liquid crystal display at a high voltage", Jan. 15, 2000, vol. 87, Issue 2, pp. 649-657.

Zhibin Huang and Charles Rosenblatt, "Large polar pretilt for the liquid crystal homologous series alkylcyanobiphenyl", Department of Physics, Case Western Reserve University, Cleveland, Ohio 44106, Aug. 17, 2004, pp. 11.

Ghanshyam P. Sinh, Bing Wen, and Charles Rosenblatt, "Large, continuously-controllable nematic pretilt from vertical orientation", Applied Physics Lett. 79, 2543, 2001.

Applied Physics Letters, "Homeotropic, rub-free liquid-crystal light shutter", Jul. 4, 1994, vol. 65, Issue 1, pp. 118-120.

Applied Physics Letters, "Molecular tilt direction in a slightly tilted homeotropic aligned liquid crystal cell", Applied Physics Letters, Dec. 27, 1993, vol. 63, Issue 26, pp. 3577-3579.

M. O'Neill and S. M. Kelly, "Photoinduced surface alignment for liquid crystal displays", Journal of PhysicsD: Applied Physics, 33, R67-R84, 2000.

Kazuaki Hatsusaka, "Doctoral Thesis", Journal of Phthalocycanine Theses, Mar. 2003.

Yeh, Pochi "Introduction to Photorefractive Nonlinear Optics", Mar. 1993.

Larraga et al., "Laser Induced Refractive index Change in Nematic Liquid Crystals", Scienc Diliman, vol. 11, No. 2 (Jul. to Dec. 1999).

* cited by examiner

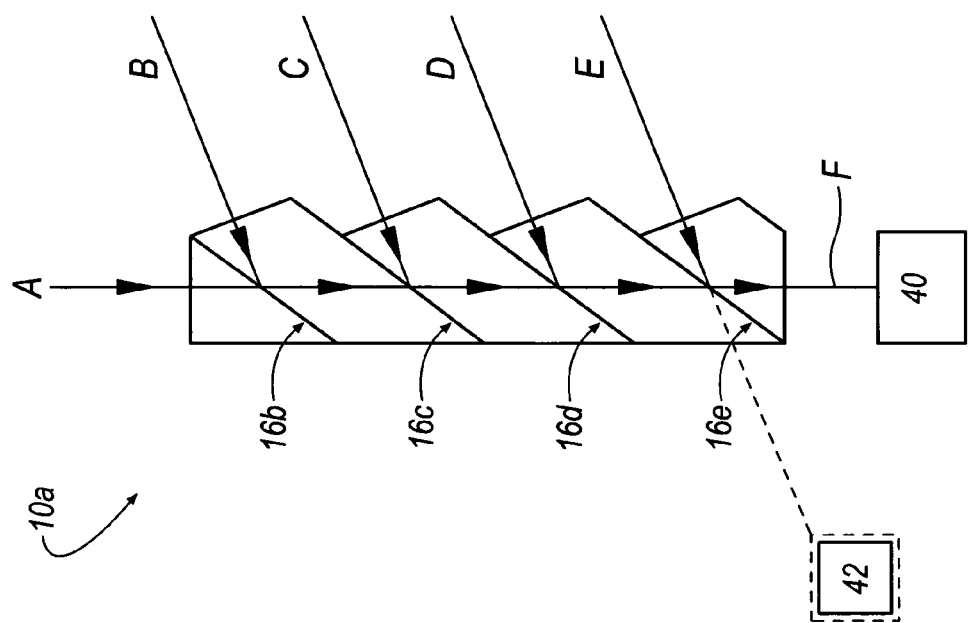

OPTICAL CONTROL DEVICE AND METHOD

TECHNICAL FIELD

The present invention relates to optical control devices and systems, and methods for using such devices and systems.

BACKGROUND

Mechanical switches are used in a number of applications for controlling the operation of a given device. Switches with mechanical moving parts are familiar and relatively simple, but can sometimes suffer from problems common to mechanical devices, including physical deterioration caused by normal usage. As such, there is a need for improved switchable or scannable optical devices.

SUMMARY

Accordingly, the invention is directed to an optical control device, comprising a first member; a second member; an active stage between the first member and the second member, the active stage including an electro-optical material; a first transmission region for transmitting a first optical signal toward the first member; and a second transmission region for transmitting a second optical signal toward the second member. The index of refraction of the active stage can be varied to either reflect both the first optical signal and the second optical signal or to permit the transmission of the first optical signal and the second optical signal through the first and second member. The index of refraction can be modified by an electric field associated with the active stage. The invention is further directed to a method for using an optical control device or optical control system.

Other embodiments, variations, aspects and advantages of the invention will be understood in view of the description below.

BRIEF DESCRIPTION OF THE DRAWINGS

FIG. 4 is an illustration of still another embodiment of an optical control device.

DETAILED DESCRIPTION OF PREFERRED EMBODIMENTS

Figure 1:
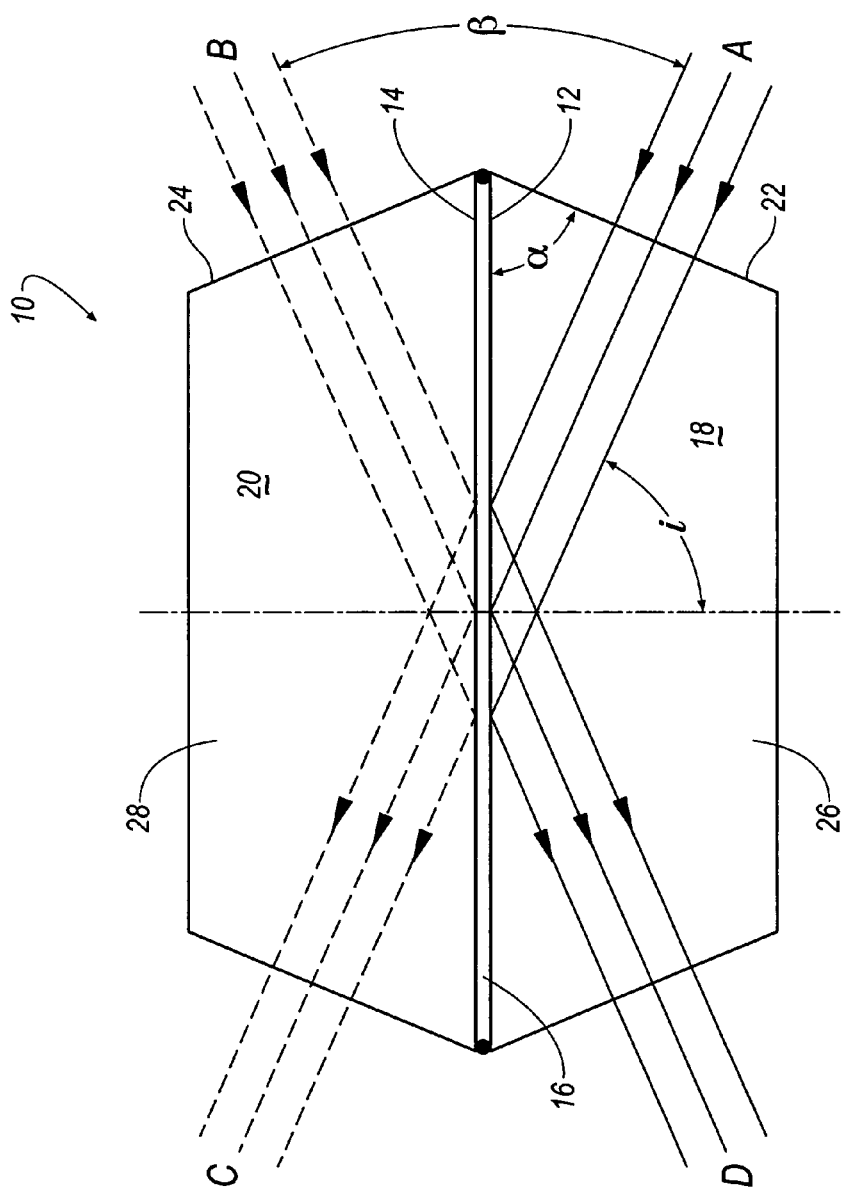
FIG. 1 is an illustration of an embodiment of an optical control device.

FIG. 1 is an illustration of an embodiment of an optical control device 10. The device includes a first member 12, a second member 14, an active stage 16, and first and second transmission regions 18,20. Together the active stage 16 and the first and second members 12,14 comprise an "active element." The first transmission region 18 includes a region adjacent or proximate first member 12. Similarly, the second transmission region 20 includes a region adjacent or proximate second member 14.

First and second members 12,14 include electrical conductors. The conductors may be comprised, for example, of transparent electrodes or plates. Active stage 16, which is located, at least in part, between the first and second members 12,14, is comprised of an electro-optical material, which may, without limitation, include liquid crystals, poly (N-vinylcarbazole) (PVK), PMMA or other photorefractive materials. First and second members 12,14 produce an electric field associated with or within the active stage 16. The active element (12,14,16) has a variable index of refraction.

In an embodiment of the invention, the index of refraction ($n_1$) associated with active stage 16 can be changed by the electric field between first and second members 12,14. For example, when the active stage 16 is comprised of liquid crystals, applying a low voltage to the first and second members 12,14 results in an electric field, causing the material in the active stage 16 to change its index of refraction by changing the orientation arrangement of the liquid crystal molecules. When the optical signal (such as a light beam) is directed through the active stage 16, the change in the active stage's index of refraction deflects the optical signal's path from its original path by an amount dependent on the magnitude of the applied voltage (if any is applied) and the corresponding electric field.

The index of refraction, $n_1$, of an active stage 16 comprised of E7 liquid crystals may be varied, for example, from about 1.56 to about 1.73. However, the index of refraction and the amount of associated variance depends upon the type of liquid crystal or other electro-optical material employed. In one particular embodiment, the active element comprises two electrically conductive plates (first and second members) facing each other with an orienting layer deposited on each facing surface of the conductive plates and a reflective layer (active stage) sandwiched in between the orienting layers.

In an embodiment of the invention, the first and second members 12,14 are substantially planar and can be made of any sufficiently transparent conductive material. For example, the first and second members 12,14 can be constructed by depositing an electrically-conductive material, such as indium-tin-oxide, onto a glass plate.

For some applications, first and second transmission regions 18,20 may include a block of material. The block of material may be comprised of glass or other transparent material capable of conveying an optical signal without an unacceptable amount of distortion. Depending upon the application, the device 10 may also optionally include a first transmission interface 22 associated with a first optical signal, a second transmission interface 24 associated with a second optical signal, or both first and second transmission interfaces 22,24.

Device 10 may also include two passive elements or stages 26, 28 with fixed or fixable indexes of refraction ($n_2$). The passive elements or stages may act as a total internal reflection (TIR) stage and the angle at which an optical signal (e.g., light) exits the passive element or stage can be controlled by changing the angle at which the signal enters the passive element or stage. The concept of TIR is generally described in U.S. Pat. No. 6,567,206 to Minardi et al. and is explained further below. Note that the passive element does not necessarily have to be an element having a fixed index of refraction. It is further noted that the passive element or stage can also be an element whose index of refraction may be varied provided the index is fixable at a predetermined value when used in the optical device.

As shown in FIG. 1, a first optical signal A is shown transmitted through the first transmission region 18 toward the first member 12. Similarly, a second optical signal B is shown transmitted through the second transmission region 20 toward second member 14.

In the embodiment illustrated in FIG. 1, an angle (α) is set equal to the angle of incidence (i) desired relative to the interface with first member 12. With such a configuration, optical signal (A), for example, a light signal, will enter the first transmission region 18 without refraction. When the optical signal A strikes the first interface at member 12, it will either experience total internal reflection (TIR), or will be transmitted through the active stage 16, depending upon the value of the index of refraction ($n_1$) of the active stage 16, as explained further herein. For example, if $n_1$, is 1.56 and $n_2$ is 1.8, the optical signal A would experience TIR for a value of i equal to 61 degrees. If $n_1$ is changed to 1.73, the optical signal A would be transmitted through the active stage 16. Consequently, depending upon the index of refraction, $n_1$, associated with the active stage 16, either optical signal A arrives at position D (with TIR) or optical signal B arrives at position D (with transmission through the active stage 16). In a similar manner, either optical signal B arrives at position C (with TIR) or optical signal A arrives at position C (with transmission through the active stage 16).

Angle β is the change in the view angle from the first and second transmission regions 18,20. In the case where α=i, then β=180−2i. (For example, β is equal to 58 degrees when i is equal to 61 degrees. However, the use of a fixed mirror or reflector in the second transmission region 20 (associated with optical signal B), permits almost any value of the view angle that may be desired, including a 0 degree angle.

In an embodiment of the invention, a charge coupled device (CCD) may be located in the region about position C and/or D. For example, with the inclusion of such a CCD about position D, a digital picture or video could be taken of either optical signal A (with TIR) or optical signal B (with transmission through the active stage).

Generally, with such a configuration, the transmitted image or optical signal will be a "mirror image" when reflected from the active stage, and a normal image or optical signal when transmitted through the active stage. However, if a user's eye was positioned at or about position C, the user could view the optical signal A (with transmission) or record a digital or film picture at position D (with TIR). However, it is noted that a mirror or reflector can be used with the foregoing configuration to obtain a "normal" image or optical signal at position D. With configurations such as the foregoing, the control device 10 can function like a single lens reflex camera. If film is used, the active stage 16 can act as a form of shutter since a light signal will not reach position D from optical signal A until the value of the index of refraction of the liquid crystals is reduced to about 1.56 (the light from optical signal B being blocked for such application) when the index of refraction of first transmission region 18 is, for example, 1.8.

Properties of the device and system can be selected to control the operation of the device or system. For instance, to better insure the intended operation of the device 10, the first and second members 12,14 include transparent conductors, which can have selective indexes of refraction. If the index of refraction of the first and second members 12,14 matches or approximates the index of refraction for the associated passive stage (e.g., 26 or 28), then there is little or no effect on the operation of the device. If the index of refraction of the first and second members 12,14 is greater than the index of refraction of the associated passive stage, there is a negligible effect. However, if the index of refraction is smaller than the index of the associated passive stage, it could prevent proper operation.

For example, if the index of refraction of the conductors of the first and second members is 1.56, there would always be a reflection (TIR) at the interface between the surface or coating of the first or second member and the adjacent passive stage irrespective of the value of the index of refraction for the liquid crystals. A coating may, for example, comprise a transparent conductive coating that permits an optical signal to pass through it without unacceptable distortion. If a coating is associated with the first or second members, the coating's index of refraction may be made to match the index of refraction of the associated passive stage. By way of example, without limitation, the index of refraction may be 1.8.

Figure 2:
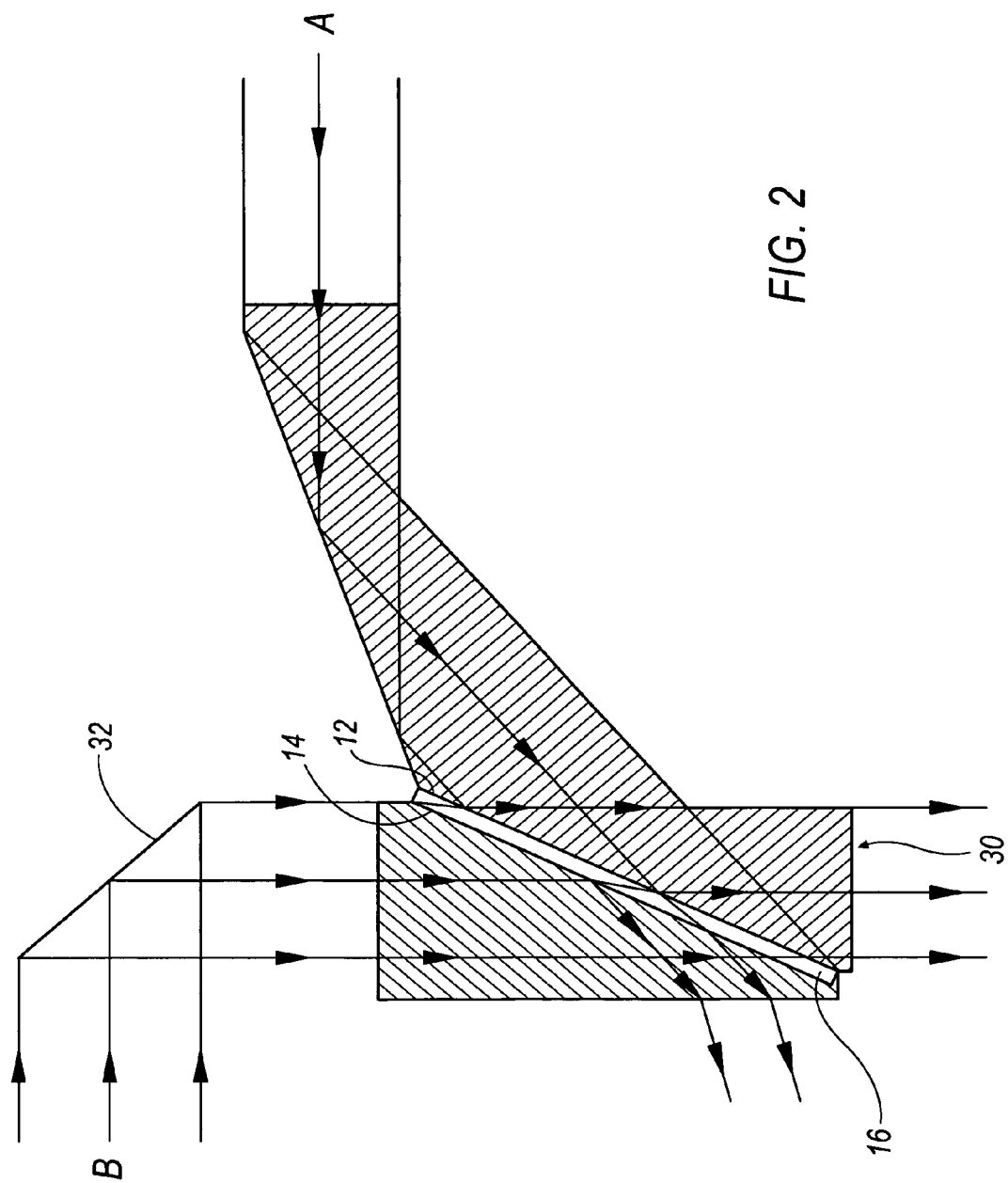
FIG. 2 is an illustration of another embodiment of an optical control device.
Figure 3:
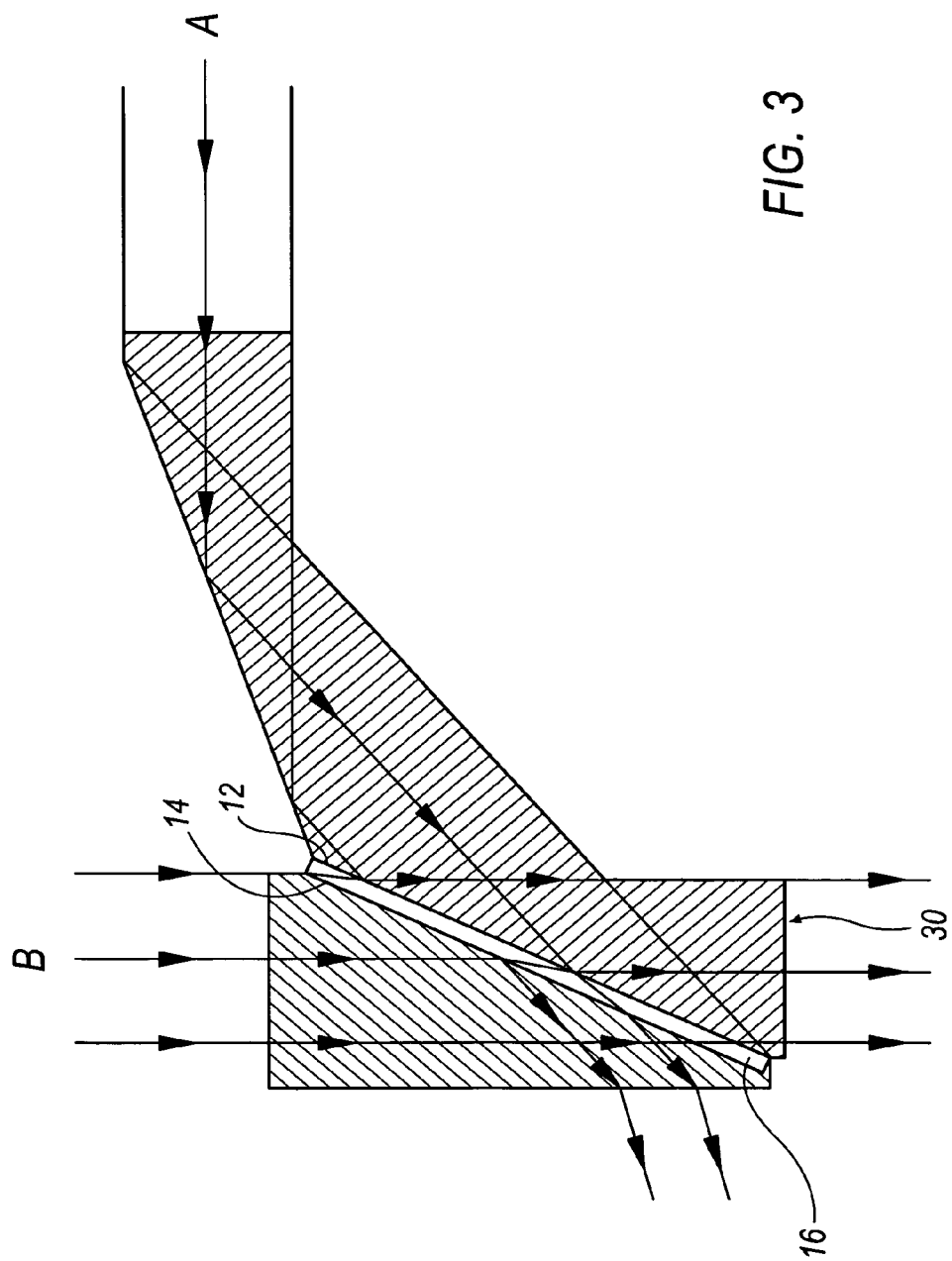
FIG. 3 is an illustration of yet another embodiment of an optical control device.

In general, the angle of incidence, i, is at the discretion of the designer provided that the associated optical signal or light beam can be switched from transmission to reflection (TIR). FIGS. 2 and 3 illustrate, without limitation, some examples of how the value of the angle of incidence, i, can be manipulated. For instance, with the configuration shown in FIG. 2, by employing a mirror or reflector 32, optical signals A and B are depicted coming from substantially opposite directions. FIG. 3, illustrates an example of a configuration in which signals A and B approach in directions that are substantially perpendicular to one another.

With reference to FIGS. 2 and 3, the signal from optical signals A or B can be directed to exit 30 by changing the index of refraction of the active stage 16. If the index of refraction of the active stage 16 is, for example, 1.56 then the total internal reflection (TIR) occurs at the interface between the active element (12,14,16) and the passive element (depicted in the figures with cross-hatching), where the passive elements have an index, for example, of 1.8. If the active elements have an index of refraction of 1.73, then the signal impinging at the interface from either signal/direction is transmitted through the active elements.

In another embodiment of the invention, more than two optical signals can be directed to the device 10a. Without limitation, FIG. 4 illustrates an example of a device 10a in which five optical signals A, B, C, D, and E are directed to the device 10a and are associated with a single desired output signal F, which can be directed to an output element 40, such as a CCD or other signal-capturing device. Among other things, such a multiple-signal-input configuration permits an image to be captured from more than two directions.

The associated active stages 16b, 16c, 16d and 16e can either transmit or reflect the input associated with signals A, B, C, D, and E. It is noted that although the active stages 16b, 16c, 16d, and 16e identified in FIG. 4 by single lines, each such active stage additionally includes first and second members 12,14, such as those previously described. If all of the active stages 16b, 16c, 16d and 16e are set to permit transmission through them, then only the image associated with optical signal A will be transmitted, because it would be transmitted straight through the device without reflection to the output element 40. It is noted that typically to provide proper transmission through the active stage, where the electro-optical material is comprised of liquid crystal molecules, there must be alignment of the liquid crystal molecules and the alignment direction associated with the associated opposing members 12,14 should be the same. See, for example, without limitation, U.S. Pat. No. 3,834, 792. Conversely, if any one of the active stages 16b, 16c, 16d or 16e (associated with optical signals B, C, D, and E, respectively) is set to reflect, then (a) the image associated with optical signal A will be reflected away and (b) the image associated with the active stage in such reflective mode, whether optical signal B, C, D, or E, will be reflected and become the output signal F that is sent through to the output element 40.

For instance, if the active stage 16*d* (associated with optical signal D) is set to reflect, then the image associated with optical signal D will be the image that is reflected and sent on to the output element 40. Under those circumstances, the signal or image associated with optical signal A would be reflected away by active stage 16*d* and the other signals or images associated with optical signals B, C, and E would simply be transmitted through their respective active stages.

If more than one of the active stages (e.g., 16*b*, 16*c*, 16*d*, and 16*e*) is set to reflect, the image or signal that is transmitted on to the output element 40 will be the image or signal that is the last to be reflected. For example if active stages 16*b* and 16*c* are set to transmit and active stages 16*d* and 16*e* are set to reflect, the image or signal associated with optical signal E will be the image or signal that makes it to output element 40. Optical signal A would be reflected by active stage 16*d*. Optical signals B and C would be transmitted through active stages 16*b* and 16*c*. The image or signal associated with optical signal D would be reflected by active stage 16*d* toward the output element 40, however, it would then be reflected away by active stage 16*e*. It is noted that while all of the active stages are generally shown in linear succession, it is possible to configure more complex networks of active elements, including one or more that are not in the linear (e.g., column-like) succession to convey any desired optical signal (selected from a plurality of signals) to a desired output element. For instance, with respect to the configuration discussed immediately above, one or more additional active stages (not shown) could be configured to selectively convey (via control of the electrical fields) a desired optical signal to a desired output, such as output 40.

Further, if desired, additional output elements (such as additional CCDs) can be included to capture signals that are not reflected to output element 40. For instance, as in the previous example, an additional output element 42 could be used to capture the image or signal associated with optical signal D, which was reflected by active stage 16*e*.

Moreover, in addition to or in place of output element 42, other output elements (not shown) could be included to capture signals or images associated with other reflected or transmitted signals (e.g., those associated with signals A, B, and C in the preceding example). Of course, as with the previous embodiments, fixed mirrors or reflectors can be systematically included and positioned to provide optical signals and images, either to or from, the device from almost any desired angle or direction.

As is readily apparent to one of skill in the art, the present invention can be employed in a wide variety of applications. The low operating voltage and the possible small size of the inventive device allows the invention to be incorporated into virtually any device that normally uses a mechanical switch, including common consumer devices. Moreover, the device can be used to select a desired signal output from a plurality of signal inputs without moving parts. For instance, images from several views associated with a vehicle could be viewed on a single monitor or screen, with the selection of the desired signal or images being accomplished by a simple electrical change communicated to a given active stage. In other applications, a single camera can be used to view two or more images at one time and can be electrically selective (by providing a select voltage) as to which image is captured.

The documents, patents, and patent applications referred to herein are hereby incorporated by reference.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An optical control device, comprising:
    a first member including an electrical conductor;
    a second member including an electrical conductor;
    an active stage providing a total internal reflection stage between the first member and the second member, the active stage including a liquid crystal with an index of refraction that can be varied from about 1.56 to about 1.73, and the total internal reflection associated with the total internal reflection stage covers the optical visible spectrum;
    a first transmission region for transmitting a first optical signal toward the first member; and
    a second transmission region for transmitting a second optical signal toward the second member;
    wherein the index of refraction of the active stage can be varied to reflect at least one of the first optical signal and the second optical signal while permitting the transmission of at least one of the other of the first optical signal and the second optical signal through the first and second member.

2. An optical control device as recited in claim 1, wherein the first member and second member comprise transparent conductive electrodes or plates.

3. An optical control device as recited in claim 1, wherein the active stage includes poly (N-vinylcarbazole) (PVK) or PMMA.

4. An optical control device as recited in claim 1, wherein the electric field associated with the active stage is provided by a voltage differential between the first member and the second member.

5. An optical control device as recited in claim 3, wherein the first member, the second member, or both the first and second members, include a transparent conductive coating.

6. An optical control device as recited in claim 1, wherein the first transmission region includes a first transmission interface and the second transmission region includes a second transmission interface.

7. An optical control device as recited in claim 6, wherein the first optical signal is transmitted into the first transmission region toward the first member through the first transmission interface and the second optical signal is transmitted into the second transmission region toward the second member through the second transmission interface.

8. An optical control device as recited in claim 7, wherein the first optical signal is transmitted through the first interface at an angle that is substantially normal to the first interface and the second optical signal is transmitted through the second interface at an angle that is substantially normal to the second interface.

9. An optical control device as recited in claim 1, wherein the first and second transmission regions include a block of material.

10. An optical control device as recited in claim 9, wherein the block of material is comprised of glass or a transparent material.

11. An optical control device as recited in claim 1, including a lens.

12. An optical control device as recited in claim 1, including a reflector.

13. An optical control device as recited in claim 1, including an optical signal collector.

14. An optical control device as recited in claim 13, wherein the optical signal collector includes a charge-coupled device.

15. An optical control device, comprising:
   a plurality of active elements,
      each active element comprising a first member; a second member; and an active stage that provides a total internal reflection stage between the first member and the second member, the active stage including a liquid crystal with an index of refraction that can be varied from about 1.56 to about 1.73, and the total internal reflection associated with the total internal reflection stage covers the optical visible spectrum and having an index of refraction that can be varied by an electric field associated with the active stage to either reflect or transmit an optical signal; and
   an output element;
   wherein the optical signal permitted to reach the output element is controlled by the electric field associated with the active elements.

16. An optical control device as recited in claim 15, wherein the output element includes a charge coupled device or signal-capturing device.

17. An optical control device as recited in claim 15, including a plurality of output elements.

18. An optical control device as recited in claim 17, wherein output elements correspond to signals conveyed by two or more active elements.

19. An optical control device as recited in claim 18, wherein each active element can convey a transmitted or reflected signal to a different output element.

20. An optical control device, comprising:
   a plurality of active elements,
      each active element including a means for varying the index of refraction associated with the active element by an electric field so that the active element either reflects or transmits an optical signal, wherein the means provides a total internal reflection stage with an index of refraction that can be varied from about 1.56 to about 1.73, and the total internal reflection associated with the total internal reflection stage covers the optical visible spectrum; and
   an output element;
   wherein the optical signal that is permitted to reach the output element is controlled by the electric field associated with the active elements.

21. A method for using an optical control device, comprising:
   providing a control device including an output element and an active element, the active element including a liquid crystal and having an index of refraction that can be varied from about 1.56 to about 1.73, wherein the active element is controlled by an electric field associated with the active element and the active element controllably provides total internal reflection that covers the optical visible spectrum,
   providing a first optical signal and a second optical signal;
   controlling the electric field associated with the active element to selectively permit either the first optical signal or the second optical signal to reach the output element.

22. A method as recited in claim 21, including more than two active elements and more than two optical signals, wherein the optical signal that is permitted to reach the output element is selectively controlled by adjusting the electric field associated with a plurality of active elements.

23. A method as recited in claim 22, including a plurality of output elements, wherein the optical signals that reach the output elements is selectively controlled by controlling the electric field associated with the active elements.

24. A method as recited in claim 21, wherein the optical signals are directed to the control device from different directions relative to each other.

25. A method as recited in claim 24, wherein the optical signals are directed to the control device from substantially opposite or substantially perpendicular directions.

* * * * *